United States Patent [19]

Brock et al.

[11] Patent Number: 4,818,139
[45] Date of Patent: Apr. 4, 1989

[54] METHODS AND APPARATUS FOR MAKING AN ASPHALT-AGGREGATE PAVEMENT

[75] Inventors: James D. Brock, Chattanooga, Tenn.; Donald W. Smith, Aurora, Ill.; John P. Renneck, Chattanooga, Tenn.

[73] Assignee: Barber-Greene Company, KeKalb, Ill.

[21] Appl. No.: 89,318

[22] Filed: Aug. 25, 1987

[51] Int. Cl.⁴ ............................................. E01C 19/00
[52] U.S. Cl. ........................................ 404/81; 404/91; 404/104; 404/108; 404/109
[58] Field of Search ...................... 404/84, 81, 91, 92, 404/95, 101, 102, 104–106, 108–111, 72; 414/528

[56] References Cited

U.S. PATENT DOCUMENTS

| | | | |
|---|---|---|---|
| 3,225,668 | 12/1965 | Maginniss | 404/101 X |
| 3,807,634 | 4/1974 | Vogt | 404/111 X |
| 4,145,154 | 3/1979 | Mingot | 404/108 X |
| 4,226,552 | 10/1980 | Moench | 404/91 X |
| 4,272,212 | 6/1981 | Bauer, Jr. et al. | 404/91 X |
| 4,304,504 | 12/1981 | Trujillo | 404/108 |
| 4,311,408 | 1/1982 | Wren | 404/104 |
| 4,317,642 | 3/1982 | Wirtgen | 404/91 X |
| 4,534,674 | 8/1985 | Cutler | 404/101 X |
| 4,636,110 | 1/1987 | Augoyard | 404/105 X |
| 4,682,909 | 7/1987 | Mihara | 404/95 X |

Primary Examiner—Jerome W. Massie, IV
Assistant Examiner—John F. Letchford
Attorney, Agent, or Firm—Jones, Day, Reavis & Pogue

[57] ABSTRACT

An apparatus and method for delivering asphalt-aggregate material from a plurality of supply trucks to a finishing machine. In a preferred form of the invention the hopper of the finishing machine is modified to have a capacity substantially equal to the capacity of one of the supply trucks. The apparatus is a self-propelled storage vehicle including a hopper having a capacity substantially equal to the capacity of one of the supply trucks, a high capacity loading conveyor, and a high capacity unloading conveyor system. A transversely disposed screw auger is provided for remixing the asphalt-aggregate material in the hopper prior to its discharge to the finishing machine. In the first method of operation the storage vehicle shuttles between the finishing machine and a remote location of the supply trucks and in the second method of operation the storage vehicle travels in tandem with the finishing machine as the paving operation is performed.

20 Claims, 3 Drawing Sheets

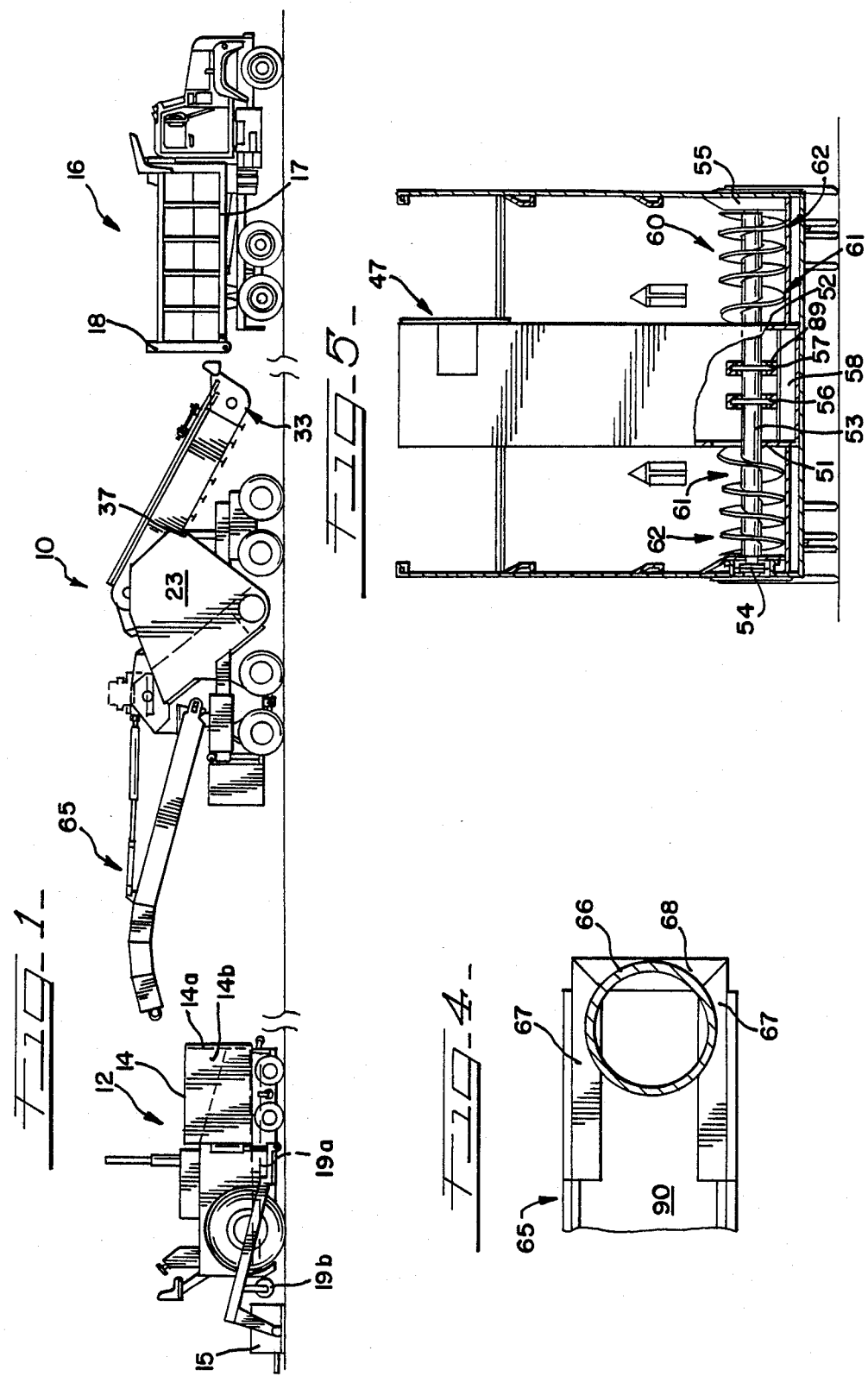

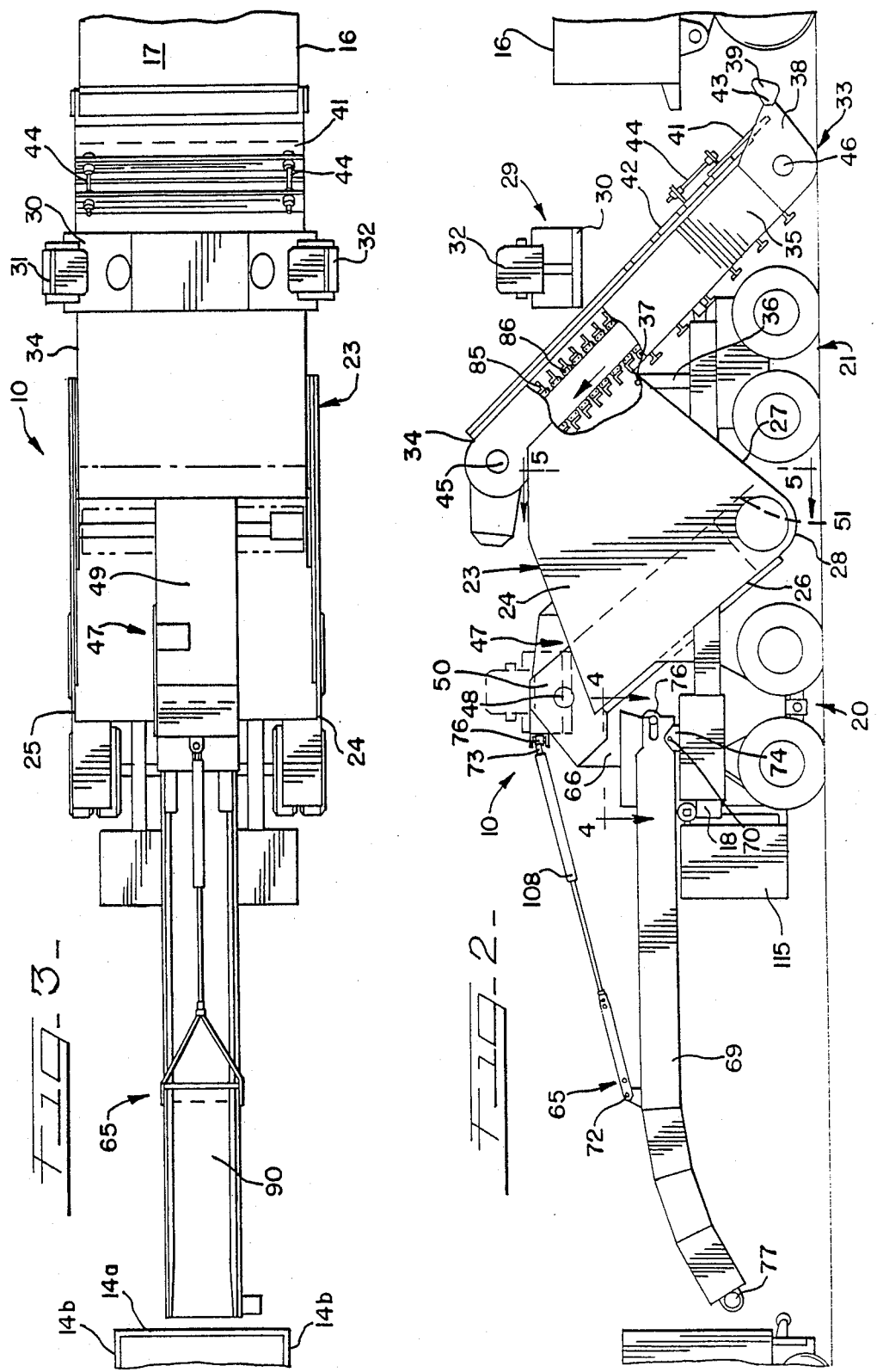

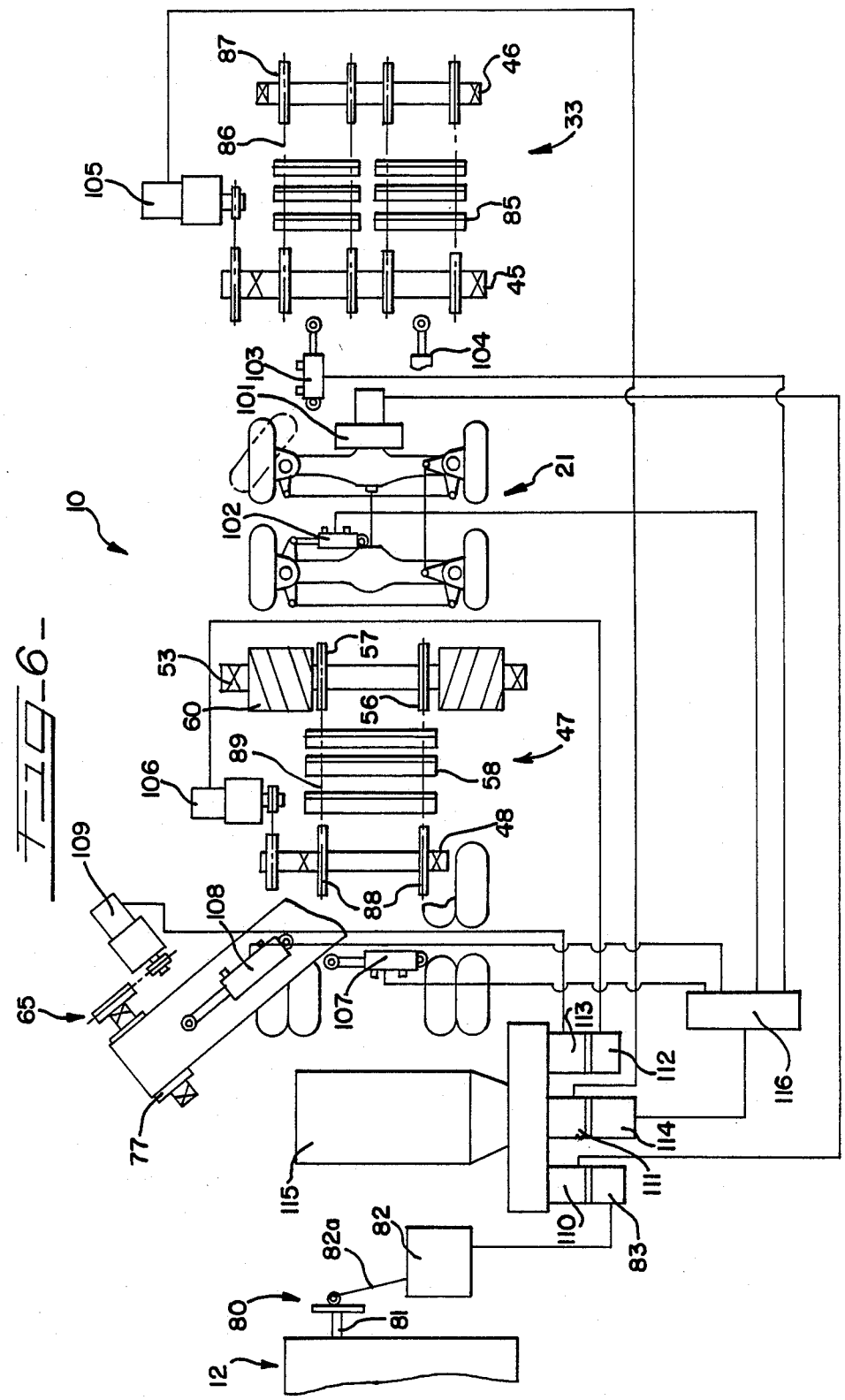

METHODS AND APPARATUS FOR MAKING AN ASPHALT-AGGREGATE PAVEMENT

BACKGROUND OF THE INVENTION

1. Field of the Invention

The present invention relates in general to methods and apparatus for making an asphalt-aggregate pavement. In particular, the invention relates to methods and apparatus for transporting the asphalt-aggregate material from the delivery trucks to the screed of a finishing machine.

2. Summary Of The Prior Art

The conventional method of laying an aspahlt-aggregate roadway mat includes the use of a finishing machine and a number of delivery trucks to transport the asphalt-aggregate material from the asphalt plant to the job site. Finishing machines of the type hereunder consideration, sometimes called pavers, are well-known to those skilled in the art. Such a finishing machine has a so-called floating screed at its rear end, usually provided with some form of vibratory means, to form the asphalt mat. The finishing machine also includes a hopper at its front end for receiving the asphalt-aggregate material and suitable conveyor means, usually slat conveyors and screw augers, for delivering the material from the hopper to a position just in advance of the screed.

A typical finishing machine has a hopper with a capacity of approximately 5 tons. A typical delivery truck, usually a dump truck, will have a capacity of approximately 20 tons. The technique for transferring the asphalt-aggregate material from the dump truck to the hopper of the finishing machine screed normally requires the truck driver to position his vehicle immediately in front of the finishing machine, the latter being provided with rollers which engage the rear tires of the truck. During the time that the material is being transferred from the dump truck to the hopper of the finishing machine, the latter is advancing along the subgrade as it forms the asphalt-aggregate mat and in doing so pushes the truck forwardly in tandem therewith.

A number of problems arise when operating the finishing machine and the delivery trucks in the manner just described. Quite frequently, the hopper of the finishing machine will be nearly empty and thus ready to be refilled, but a loaded dump truck will not be available at the job site. The absence of a loaded delivery truck at the required time is most often due to traffic conditions which prevent the delivery trucks from arriving at the job site at the proper time intervals. When this occurs, the finishing machine must obviously stop and await the arrival of another delivery truck.

As is known to those skilled in the art, when a finishing machine stops, even momentarily, the screed will tend to settle into the freshly laid mat. When the finishing machine then commences forward travel, the screen will tend to ride upwardly momentarily thus depositing an excessive amount of material. Consequently, the stopping of the finishing machine causes a depression and bump in the surface of the asphalt-aggregate mat resulting in an uneven pavement surface. Needless to say, it is desirable to produce the smoothest possible surface.

It is often necessary to stop the finishing machine even though one or more loaded delivery trucks are available at the job site. This is so since quite often it is simply impossible for the truck drivers to remove the empty delivery truck from the front of the finishing machine and to maneuver a full delivery truck into a position in advance of the finishing machine before the finishing machine runs out of material. As illustrated in Table I (set forth below), as the paving rate of the paver, in tons per hour (TPH), increases the available truck exchange time decreases.

TABLE I

TRUCK EXCHANGE TIME FOR A CONVENTIONAL FINISHING MACHINE OPERATING DISCONTINOUSLY FINISHING MACHINE WITH 5 TON HOPPER CAPACITY OPERATES CONTINUOUSLY WITH 20 TON CAPACITY TRUCKS

| PAVING RATE (TPH) | 20 TON TRUCK INTERVAL (MINUTES) | TIME AT PAVER W/5 TON LIVE HOPPER | TRUCK EXCHANGE TIME AVAILABLE |
|---|---|---|---|
| 200 | 6 | 4.5 | 1.5 |
| 300 | 4 | 3.0 | 1.0 |
| 400 | 3 | 2.2 | 0.8 |
| 600 | 2 | 1.5 | 0.5 |

As is known to those skilled in the art, at least 1.5 minutes are required to perform the truck exchanging operation. Therefore, it is apparent from the data in Table I that a finishing machine using the conventional supply methods cannot operate continuously at a rate greater than 200 TPH. In order to operate at a higher paving rate and still provide sufficient time to exchange trucks, the paver must stop each time the hopper's supply of paving material is exhausted. This situation is illustrated in Table II (set forth below), where the finishing machine, running discontinuously, can operate at a rate of 800–1200 TPH while still providing the necessary 1.5 minutes for the truck exchanging operation.

TABLE II

TRUCK EXCHANGE TIME FOR A CONVENTIONAL FINISHING MACHINE OPERATING DISCONTINOUSLY FINISHING MACHINE WITH 5 TON HOPPER CAPACITY OPERATES DISCONTINUOUSLY WITH 20 TON CAPACITY TRUCKS

| PAVER TPH | 20 TON TRUCK INTERVAL (MINUTES) | TIME AT PAVER | TRUCK EXCHANGE TIME AVAILABLE |
|---|---|---|---|
| 400 | 6.0 | 2.3 | 3.7 |
| 600 | 4.0 | 1.5 | 2.5 |
| 800 | 3.0 | 1.0 | 2.0 |
| 1200 | 2.0 | 0.8 | 1.2 |

However, this discontinuous operation of the finsihing machine results in an undesirable depression and hump on the pavement mat each time the finishing machine is stopped to perform the truck exchanging operation, as previously explained.

There have been two general approaches in the prior art in an attempt to deal with the problems just mentioned. The first approach involves providing a delivery truck with a very substantial capacity. Representative prior art showing such trucks include U.S. Pat. Nos. 3,647,096; 3,731,825; 3,750,802; 3,794,194; and German Patent Publication No. 22 60 396 (1972), all in the name of John H. Holland. The provision of such large capacity trucks really does not solve the problem since the finishing machine still must be stopped if one of such trucks is not available in a loaded condition at the finishing machine hopper when its hopper is nearly empty. Further, the trucks shown in the aforesaid Holland patents are of the trailer-truck type making it even more difficult for the truck operator to maneuver the vehicle in advance of the finishing machine hopper.

Another approach, in an attempt to solve the finishing machine stopping problem referred to herein, involves dumping of the asphalt-aggregate material on the subgrade in the form of a windrow in advance of the path of travel of the finishing machine. According to this technique, a windrow loader machine, such as the machine shown in U.S. Pat. No. 3,693,512, is provided for picking up the material from the subgrade and for delivering the material into the hopper of the finishing machine.

This windrow approach has not proved to be very satisfactory. Although a delivery truck can normally dump its contents more rapidly in forming a windrow rather than remaining with the finishing machine when discharging the contents directly into the hopper of the latter, considerable skill is required on the part of the delivery truck driver to form a proper windrow. Accordingly, considerable time is still required to discharge the contents of the delivery truck. Thus, the delivery truck may be required to remain at the job site longer than desirable thereby delaying departure of the truck to the asphalt plant for picking up another load of the asphalt-aggregate material. Another disadvantage to the windrow technique results from the fact that the material is dumped onto the subgrade and hence some of the material picked up by the windrow loader may be contaminated with the subgrade material. Moreover, weather conditions can adversely affect the exposed asphalt material that forms the windrow.

SUMMARY AND OBJECTS OF THE INVENTION

The present invention resides in the provision of an apparatus that includes a large capacity hopper and a large capacity conveyor thereby permitting the delivery dump truck to discharge its entire contents directly into such hopper in a very rapid manner. In the preferred embodiment of the invention, the aforesaid apparatus is in the form of a self-propelled vehicle which may shuttle back and forth between the delivery trucks and the finishing machine. The present invention also resides in a method for using the apparatus of the present invention in association with delivery trucks and a modified form of the finishing machine.

A primary object of the present invention resides in the provision of a new apparatus and method for transferring asphalt-aggregate material from one or more delivery trucks to a finishing machine.

Another object of the present invention resides in the provision of, and the method of using, a self-propelled vehicle having a large capacity conveyor and hopper for shuttling back and forth between the delivery trucks and the finishing machine.

Still another object of the present invention is the provision of a self-propelled vehicle of the type described which includes a conveyor having an inlet with a width substantially the same as the width of the delivery truck thereby facilitating the rapid discharge of the contents of the delivery truck.

Another object of the present invention is the provision of a self-propelled vehicle of the type just described which is provided with a transversely disposed screw auger for remixing the asphalt-aggregate material in the hopper prior to transfer of the material to the hopper of the finishing machine.

Yet another object of the present invention is the provision of a self-propelled vehicle of the type described which is provided with a discharge conveyor, swingable in both vertical and horizontal planes, whereby the asphalt-aggregate material may be transferred from the self-propelled vehicle to the finishing machines when such vehicle is disposed on either side of the finishing machine.

These and other objects and advantages of the present invention will become apparent from the following description.

DESCRIPTION OF THE DRAWINGS

FIG. 1 is a schematic side elevation showing the preferred embodiment of the present invention, i.e., a self-propelled storage vehicle, in association with a finishing machine and a delivery truck;

FIG. 2 is an enlarged side elevation of the self-propelled storage vehicle;

FIG. 3 is a top plan view of the self-propelled storage vehicle;

FIG. 4 is a section taken along the line 4—4 of FIG. 2;

FIG. 5 is a section view taken along line 5—5 of FIG. 2 with a portion of the discharge conveyor housing cut-away to show a portion of the discharge conveyor;

FIG. 6 is a diagrammatic view showing the hydrostatic drive system for the self-propelled storage vehicle and the associated hydraulic systems for the various conveyors;

DESCRIPTION OF THE INVENTION

Referring to FIG. 1, a self-propelled storage vehicle, constituting a preferred form of the apparatus of the present invention, is generally designated 10. The self-propelled vehicle is shown in association with a finishing machine, generally designated 12, and a delivery truck, generally designated 16.

The delivery truck 16 is normally in the form of a dumptruck having a pivotably mounted bed 17 with a tailgate 18. The truck 16 transfers the aggregate-asphalt material from a remote source to the storage vehicle 10 as will be explained below.

The finishing machine may be supported either by endless tracks or by rubber tires and includes a hopper 14 and a vibratory screed 15 which is of the floating type well known to those skilled in the art. The finishing machine also includes a conventional conveyor system consisting of longitudinally disposed conveyors 19a (shown in broken lines) and transversely disposed screw augers 19b for delivering the asphalt-aggregate material from the hopper 14 to a position just in advance of the screed 15 where it is discharged onto the subgrade.

The hopper of a conventional finishing machine is open at its front and has low side walls to receive the material from the dump truck. By using the self propelled vehicle of the present invention, the hopper of the finishing machine may be modified so that its capacity is expanded from the standard 5 tons to 12 tons, or even as high as 20 tons. This modification can be made by providing a wall 14a at the front of the otherwise conventional hopper and by increasing the height of the side walls 14b, as shown in FIG. 1. Of course, the standard supply truck 16 cannot deliver the aggregate-asphalt material to the modified hopper 14 because the truck's bed 17 discharges at an elevation well below the height of wall 14a. However, the storage vehicle 10 of the present invention is able to discharge the aggregate-asphalt material into the upwardly expanded hopper 14 because the discharge conveyor can swing vertically to an adequate height, as will hereinafter be explained.

Referring more particularly to FIGS. 2, 3, and 6, the self-propelled storage vehicle 10 includes a chassis 18 that is supported on the roadway surface by first and second wheel sets 20 and 21, respectively. It will be understood that alternative roadway engaging means, such as endless tracks, could be used in place of the wheel sets 20 and 21.

As shown in FIG. 6, the hydrostatic drive system for the self-propelled storage vehicle 10 consists of individual hydraulic motors 101-109 that are supplied with fluid pressure from the hydraulic pumps 110-114. (It should be noted that the intake and exhaust lines for the hydraulic motors are represented by a single line in the drawings for improved clarity.) An engine 115 provides the motive force for the pumps as is conventional in hydraulic drive systems.

Wheel set 21 is driven by hydraulic propel motor 101 that is supplied with fluid pressure by propel pump 110. The wheel set 21 is also steerable by steer cylinder 102 which is supplied with fluid pressure from auxiliary pump 114 through manifold 116.

Referring more particularly to FIGS. 2 and 3, a large capacity storage hopper 23 is mounted on the chassis 18. The hopper 23 has a capacity approximately equal to the capacity of a single supply truck 16. The hopper, open at its top, consists of sidewalls 24, 25 and a bottom including a first inclined wall 26 joined with a second inclined wall 27 by an arcurate wall portion 28.

The self-propelled storage vehicle further includes an operator's platform 29 having a horizontally disposed frame 30 supporting identical operator control stations 31 and 32. The platform 29 is preferably mounted on the chassis 18 by means of a parallel linkage system (not shown) permitting the platform 29 to be swung back and forth over the hopper 23 (between the solid and broken line positions shown in FIG. 2) to facilitate operating the self-propelled vehicle in both directions. Of course, each operator control station includes the various controls for operating the hydraulic drive system of FIG. 6.

The storage vehicle 10 also includes a high capacity loading conveyor 33, preferably of the drag-slat type, comprising a frame 34 having side members 35 pivotably mounted to the uprights 36 of the chassis 18 by a horizontal shaft 37. Thus, conveyor 33 can be swung vertically about the horizontal shaft 37 between the loading position shown in FIG. 2 and the transport position shown in FIG. 1. The swinging movement of conveyor 33 is provided by a pair of hydraulic cylinders 103 and 104 supplied with fluid pressure by auxiliary pump 114 through manifold 116, as shown in FIG. 6.

The drag-slat conveyor 33 has slats 85 (FIGS. 2 and 6) mounted on endless chains 86 meshing with sprocket wheels 87 fixed to shafts 45 and 46. Shaft 45 is driven by hydraulic motor 105, as shown in FIG. 6, and is supplied with fluid pressure from a separate loading conveyor pump 111. The infeed end of conveyor 33 includes a trough 38 with a bumper 39 adapted to abut the back end of the supply truck 16 during the truck unloading operation. An important feature of the present invention is the provision of the trough 38 with a width substantially the same as the width of the supply truck bed 17 such that the asphalt-aggregate material can quickly and easily be dumped from the truck 16 into the trough 38.

An adjustable gate 41 is movably mounted over the infeed opening of the conveyor that is defined by the conveyor frame cover plate 42 and the lip 43 of the trough. The gate 41 is secured to the cover plate 42 by a pair of adjustable screwthread assemblies 44 such that the size of the infeed opening can be varied to regulate the flow of material into the conveyor 33. The bottom wall of conveyor 33 terminates at a position just inside of the bottom wall 27 of the hopper such that the aggregate-asphalt material will fall into the hopper as the slats of the conveyor push the material past this position, as shown in the cut-away section of FIG. 2.

Mounted on the inside surface of the hopper bottom wall 26 is a first discharge conveyor 47, as shown in FIGS. 2, 3, 5 and 6, which is preferably of the drag-slat type. The discharge conveyor 47 includes a first set of sprocket wheels 88 fixed to shaft 48. Hydraulic motor 106 drives shaft 48 and is provided with fluid pressure by a separate discharge pump 112.

A housing, consisting of a top wall 49 and a pair of opposed sidewalls 50, completely encloses the conveyor 47 except for openings 51 and 52 (FIG. 5) located in the sidewalls 50 in the area of arcuate wall portion 28. The second shaft 53 (FIG. 6) of the conveyor 47 extends through openings 51 and 52 and is journaled in suitable bearing assemblies 54 and 55, as shown in FIG. 5. Sprocket wheels 56 and 57 are fixed to shaft 53 and mesh with chains 89 that, in turn, support the slats 58.

The second shaft 53 of the conveyor 47 also functions as the shaft for the screw auger 60 that is disposed in the area of the hopper 23 defined by the arcuate wall portion 28 as shown in FIGS. 2, 3, and 5. Because the sprocket wheels 56 and 57 are fixed to the shaft 53, the hydraulic motor 106 also serves to rotate the screw auger 60. The rotation of the screw auger 60, in turn, conveys the aggregate-asphalt material from the lateral sides of the hopper, through the openings 51 and 52 and into the path of the first discharge conveyor 47. As the screw auger 60 rotates, it not only transports the material to conveyor 47 but also remixes the material such that a more uniform mixture of material is delivered to the finishing machine 12.

This mixing action of the screw auger 60 is especially important because the aggregate-asphalt material has a tendency to separate according to particle size during transportation and handling. As is known to those skilled in the art, when the asphalt-aggregate material is discharged from the surge bin at the asphalt plant into the bed of the delivery truck 16, the coarser material tends to flow toward the sides of the bed of the delivery truck. Thus, this coarser material will be transported to the sides or lateral extremities of the hopper 23 since the conveyor 33 transports the material from the bed of the delivery truck to the hopper 23 without imparting transverse or lateral movement to the asphalt-aggregate material to any significant degree. Consequently, it is desirable to remix the material in the hopper 23 by imparting the requisite lateral or transverse movement of the material from the side portions to the central portion of the hopper.

To this end, the screw auger 60 is designed such that each end of the shaft 53 is provided with first flight sections 61 joining with second flight sections 62. The pitch of the first flight sections 61 is greater than the pitch of the second flight sections 62. Thus, the volumes bounded by the flights of the first flight section 61 are greater than the volumes bounded by the flights of the second flight sections 62. As a result, when the coarse material, located at the lateral edges of the hopper, is conveyed from the second flight section 62 to the first flight section 61, it will not completely fill the larger volumes, thereby allowing the finer material, located in the central portion of the hopper, to enter the void spaces in these larger volumes and combine with the coarser material. This mixture of coarse and fine material is then conveyed to discharge conveyor 47. Thus, the variance in pitch between the flight sections 61 and 62 enhances the mixing capabilities of the screw auger 60.

A second discharge conveyor 65 is mounted on the chassis 18 such that the infeed end of conveyor 65 is located beneath the outfeed end of the first discharge conveyor 47. Material discharged from the first discharge conveyor 47 at the top edge of bottom wall 26 falls through the chute 66 onto the second discharge conveyor 65 as shown in FIGS. 2, 3, and 4. The infeed end of the frame 69 of the second discharge conveyor 65 is formed with guides 67 and 68 facilitating the flow of material from the chute 66 onto the conveyor 65. Preferably, the second discharge conveyor 65 is of the belt-type having end rollers 76, 77, and an endless belt 90. Roller 77 is driven by hydraulic motor 109 supplied with fluid pressure from pump 113 as shown in FIG. 6. It should be noted that a drag slat conveyor of the type already described may also be used.

The frame 69 is mounted for vertical swinging movement about shaft 70 and is raised and lowered by the lift cylinder 108 extending between a first pivot point 72 located on the conveyor frame 69 and a second pivot point 73 located on a rotatable sleeve 76 supported by the chassis 18. The trunnion 74 supports shaft 70 and is mounted on a turntable supported by a suitable bearing assembly (not shown) and rotated by hydraulic cylinder 107, as shown in FIGS. 2 and 6, such that the discharge end of conveyor 65 may be swung beyond the lateral extremities of the storage vehicle 10. Both the vertical lift cylinder 108 and the horizontal swing cylinder 107 are provided with fluid pressure from the auxiliary pump 114 through the manifold 116.

The self-propelled storage vehicle 10 of this invention is able to operate in either one of two alternate modes. In the first mode of operation, illustrated in FIG. 1, the storage vehicle 10 shuttles between a remote location of the supply trucks 16 and the job site where the finishing machine 12 is performing the paving operation. The finishing machine 12, having the modified hopper 14 with the expanded capacity of approximately 12-20 tons, begins the paving operation with the hopper filled with aggregate-asphalt paving material.

As the finishing machine 12 performs the paving operation, the storage vehicle 10 travels to the remote location of the supply trucks 16 where its loading conveyor 33 is positioned adjacent the rear of one of the trucks. The paving material is dumped from the truck 16 into the trough 38 where the loading conveyor 33, operating at a capacity of 800–1200 tons per hour (TPH), completely transfers the 20 tons of paving material from the truck 16 to the hopper 23 in approximately one minute.

The storage vehicle 10, with a full load of paving material in hopper 23, then travels to a position adjacent the finishing machine such that the output end of the second discharge conveyor 65 is disposed over the finishing machine's expanded hopper 14. In the time required for the storage vehicle 10 to travel to the supply truck 16, transfer the paving material from the truck 16 to the hopper 23, and return to the finishing machine, the supply of paving material in the finishing machine's hopper will have been nearly exhausted. Because it is desirable to have the finishing machine travel continuously, the storage vehicle operator controls the propel motor 101 so that the output end of conveyor 65 remains over the hopper 14 of the moving paving machine 12. As the two machines travel in tandem down the roadway, the auger 60, first discharge conveyor 47, and second discharge conveyor 65 are operated at a high capacity rate of 500–1200 TPH such that the 20 tons of paving material are completely transferred from the storage vehicle 10 to the finishing machine hopper 14 in approximately one minute. Thus, the finishing machine may run continuously while the storage vehicle 10 repeats this shuttle loading operation.

In the second mode of operation, the self-propelled storage vehicle 10 always travels adjacent the finishing machine 12, rather than shuttling between the remote location of the supply trucks and the finishing machine as in the first mode of operation. To coordinate the relative speeds of the two vehicles as they travel together down the roadway surface, a control linkage 80 is used between the finishing machine 12 and storage vehicle 10 as shown in FIG. 6. The control linkage 80 consists of a rigid finger 81 fixed to and extending from the front end of the finishing machine 12. This finger contacts a movable lever 82a of sensor 82 located on the storage vehicle 10. The sensor 82 is operatively connected to an output control 83 of the propel pump 110 such that the speed of the storage vehicle 10 is controlled to maintain a constant pressure on the sensor lever 82a by the finger 81. Thus, the speeds of the two vehicles, and consequently, the distance between the two vehicles are maintained constant as they travel down the roadway. It will be understood that the control linkage 80 could be eliminated and the propel motor 110 controlled by an operator to maintain the speed of the vehicle 10 substantially the same as the finishing machine.

Continuing with a description of the second mode of operation, the paving operation begins with the storage machine hopper 23 and the finishing machine hopper 14 fully loaded with paving material. As the paving operation progresses, the storage vehicle 10 begins to transfer the paving material from its hopper 23 to the finishing machine hopper 14 while the two vehicles travel along the roadway together. However, unlike the first mode of operation, the paving material is discharged at a rate approximately equal to the paving rate of the finishing machine. Thus, a steady-state flow of material occurs between the storage vehicle 10 and finishing machine 12. Because the paving material of the storage vehicle 10 is slowly discharged onto the finishing machine hopper, it is not necessary to use a modified finishing machine with the expanded hopper 14. Thus, a conventional finishing machine may be used. However, it is preferable to use the expanded hopper 14 because the greater the combined storage capacity of the storage vehicle 10 and the finishing machine 12, the fewer trucks needed to maintain the storage vehicle 10 loaded, which, of course, translates into a cost reduction for the paving operation.

During this gradual discharging of the paving material from the storage vehicle hopper 23, a supply truck is backed into abutting engagement with the bumper 39 of the storage vehicle 10 and is pushed along therewith. Thus, when the supply of paving material in the hopper 23 has been nearly depleted, the paving material in the supply truck, that has already been positioned at the trough 38, can be quickly transferred to the hopper 23 by the high capacity loading conveyor 33 operating at a capacity of 900–1200 TPH. This process is repeated continuously such that a constant supply of paving material is made available to the finishing machine.

In either mode of operation, the vertical and horizontal swinging of the second discharge conveyor 65 allows the storage vehicle 10 to feed the finishing machine hopper 14 even when the two machines are riding on surfaces having different elevations or when the machines are traveling offline or side by side. The horizontal swinging movement of conveyor 65 also facilitates the feeding of the material when the vehicles are rounding corners.

The paving method and apparatus of this invention provide a more efficient loading capability for the finishing machine that results in a higher quality paved surface. As illustrated in Table III (set forth below), the storage vehicle and finishing machine, when used in the first mode of operation, can pave continuously at a rate of 500 TPH while still allowing a 1.5 minute truck exchange time.

TABLE III

TRUCK EXCHANGE TIME USING A STORAGE VEHICLE ACCORDING TO THE INVENTION FINISHING MACHINE WITH 20 TON CAPACITY HOPPER OPERATES CONTINUOUSLY WITH 20 TON TRUCKS ACCORDING TO THE FIRST MODE OF OPERATION OF THE INVENTION

| PAVER TPH | 20 TON TRUCK INTERVAL (MINUTES) | TIME AT PAVER @ (1200 TPH) (MINUTES) | TRUCK EXCHANGE TIME |
|---|---|---|---|
| 200 | 6 | 1 | 5 |
| 300 | 4 | 1 | 3 |
| 400 | 3 | 1 | 2 |
| 500 | 2½ | 1 | 1½ |
| 600 | 1 | 1 | 1 |

This is a 300 TPH increase over the prior art system referred to in Table I. Moreover, in the second mode of operation, where the supply of paving material from the storage machine is continuous, the paving rate of the system is increased such that it is substantially equal to the maximum paving rate of the finishing machine. In either mode of operation, the paving operation runs continuously to provide a higher quality paved surface having no undesirable depressions or lumps.

Although the invention has been described in its preferred forms with a certain degree of particularity, it is to be understood that the present disclosure has been made by way of example only. Numerous changes in the details and construction of the combination and arrangement of parts will be apparent without departing from the spirit and scope of the invention, as defined in the appended claims.

What is claimed is:

1. The method of laying an asphalt-aggregate pavement mat comprising the steps of:
   (a) operating a finishing machine of the type having a screed for forming an asphalt-aggregate pavement mat;
   (b) operating a plurality of delivery trucks to transport the asphalt-aggregate material in a sequential manner from an asphalt plant to the job site;
   (c) providing a self-propelled mobile apparatus which includes:
      (i) hopper means,
      (ii) first conveyor means for receiving the asphalt-aggregate material from a delivery truck and for advancing the material to the hopper means, and
      (iii) second conveyor means for transporting the asphalt-aggregate material laterally from the hopper means to the finishing machine;
   (d) operating the self-propelled mobile apparatus for transferring the asphalt-aggregate material from the delivery trucks one at a time to the hopper means; and
   (e) operating the self-propelled mobile apparatus for transferring material from such apparatus to the finishing machine while the former is positioned to one side of the latter.

2. The method according to claim 1 comprising the further step of providing the second conveyor means in the form of a swinging conveyor which may be swung horizontally such that the discharge end thereof extends alternately beyond each lateral extremity of the self-propelled mobile apparatus.

3. The method of laying an asphalt-aggregate pavement mat comprising the steps of:
   (a) operating a finishing machine of the type having a screed for forming an asphalt-aggregate pavement mat;
   (b) operating a plurality of delivery trucks to transport the asphalt-aggregate material in a sequential manner from an asphalt plant to the job site;
   (c) providing a self-propelled mobile apparatus which includes:
      (i) hopper means,
      (ii) first conveyor means for receiving the asphalt-aggregate material from a delivery truck and for advancing the material to the hopper means, and
      (iii) second conveyor means for transporting the asphalt-aggregate material laterally from the hopper means to the finishing machine;
   (d) shuttling the self-propelled mobile apparatus back and forth between the delivery trucks and the finishing machine for intermittently delivering the asphalt-aggregate material from the former to the latter; and
   (e) transferring the asphalt-aggregate material from the self-propelled mobile apparatus to the finishing machine while the former is positioned to one side of the latter.

4. The method according to claim 3 comprising the further steps of providing the second conveyor means in the form of a swinging conveyor which may be swung horizontally such that the discharge end thereof extends alternately beyond each lateral extremity of the self-propelled mobile apparatus.

5. The method of laying an asphalt-aggregate pavement mat comprising the steps of:
   (a) operating a finishing machine of the type having a screed for forming an asphalt-aggregate pavement mat;
   (b) operating a plurality of delivery trucks to transport the asphalt-aggregate material in a sequential manner from an asphalt plant to the job site;
   (c) providing a self-propelled mobile apparatus which includes:
      (i) a chassis supporting hopper means in substantial symmetrical relationship with the longitudinal centerline of the chassis,
      (ii) first conveyor means arranged substantially symmetrically with the longitudinal centerline of the chassis for receiving the asphalt-aggregate material from a delivery truck and for advancing the material to the hopper means, and (iii) second conveyor means in the form of a swinging conveyor which may be swung horizontally such that the discharge end thereof alternately extends beyond each lateral extremity of the self-propelled mobile apparatus for transferring the asphalt-aggregate material from the self-propelled mobile apparatus to the finishing machine while the former is positioned to one side of the latter;

(d) operating the self-propelled mobile apparatus for transferring the asphalt-aggregate material from the delivery trucks one at a time to the finishing machine ; and (e) operating said first conveyor means for transferring material from a truck to said hopper means at a rate in the range of about 800–1200 tons per hour.

6. The method of claim 5 further defined by the step of shuttling the self-propelled mobile apparatus back and forth between the delivery trucks and the finishing machine for intermittently delivering the asphalt-aggregate material from the former to the latter.

7. A self-propelled mobile apparatus for supplying asphalt-aggregate material from a delivery truck to a finishing machine comprising:
(a) chassis means including ground engaging mobile support means and steering means for at least a part of the support means;
(b) motive power means carried by chassis means and connected to at least a part of said support means;
(c) hopper means mounted on said chassis means;
(d) first conveyor means mounted on said chassis means and having a receiving portion adapted to receive the asphalt-aggregate material as it is discharged from the delivery truck, said first conveyor means having a receiving end with a width at least as great as the width of the bed of the delivery truck for rapidly receiving the contents of the latter, said first conveyor means also having a delivery portion for discharging the asphalt-aggregate material into said hopper means;
(e) second conveyor means mounted on said chassis means for transporting the asphalt-aggregate material to the finishing machine; and
(f) transversely disposed third conveyor means mounted in the lower portion of said hopper means for delivering the asphalt-aggregate material to said second conveyor means.

8. The apparatus according to claim 7 wherein said third conveyor means is in the form of screw auger means.

9. The apparatus according to claim 8 wherein said screw auger means has a first pair of screw sets at the outer ends of the auger means and at least a second pair of screw auger sets inwardly of the first pair of screw sets, the second pair of screw sets having a pitch greater than the pitch of the first pair of screw sets for allowing the asphalt-aggregate material at the center portion of the hopper means to combine with the material transported by the first set of screw sets from the transverse extremities of the hopper means.

10. The apparatus according to claim 8 wherein said second conveyor means includes a first section and a second section, the first section being arranged for transporting the asphalt-aggregate material from the lower portion of the hopper means to an elevated position, the second section being in the form of a horizontally and vertically arranged swinging conveyor for receiving the asphalt-aggregate material from said first section of said second conveyor means and for delivering the material to the finishing machine.

11. The apparatus according to claim 8 wherein said screw auger means is configured for advancing the asphalt-aggregate material from the transverse extremities of the hopper means to the central portion thereof.

12. The apparatus according to claim 11 wherein said second conveyor means has first and second sections, the first section being arranged for transferring the asphalt-aggregate material from the screw auger means to an elevated position, the second section being in the form of a horizontally and vertically disposed swinging conveyor for receiving the asphalt-aggregate material from said first section of said second conveyor means and delivering the material to the finishing machine.

13. The apparatus according to claim 12 wherein said first and second sections of said second conveyor means have a width substantially less than the width of said first conveyor means.

14. A self-propelled mobile apparatus for supplying asphalt-aggregate material from a delivery truck to a finishing machine comprising:
(a) chassis means including ground engaging mobile support means and steering means for at least a part of the support means;
(b) motive power means carried by chassis means and connected to at least a part of said support means;
(c) hopper means mounted on said chassis means in substantial symmetrical relationship with the longitudinal centerline of the chassis means and having a capacity at least as large as the capacity of the delivery truck;
(d) first conveyor means mounted on said chassis means in substantial symmetrical relationship with the longitudinal centerline of the latter and having a receiving portion adapted to receive the asphalt-aggregate material as it is discharged from the delivery truck, said receiving portion having a width at least as great as the width of the delivery truck, said first conveyor means also having a delivery portion for discharging the asphalt-aggregate material into said hopper means;
(e) second conveyor means mounted on said chassis means for transporting the asphalt-aggregate material to the finishing machine; and
(f) transversely disposed screw auger means mounted in the lower portion of said hopper means for delivering the asphalt-aggregate material to said second conveyor means.

15. The apparatus according to claim 14 wherein said second conveyor means includes a first section and a second section, the first section being arranged for transporting the asphalt-aggregate material from the lower portion of the hopper means to an elevated position, the second section being in the form of a horizontally and vertically arranged swinging conveyor for receiving the asphalt-aggregate material from said first section of said second conveyor means and for delivering the material to the finishing machine.

16. The apparatus according to claim 14 wherein said screw auger means has a first pair of screw sets at the outer ends of the auger means and at least a second pair of screw auger sets inwardly of the first pair of screw sets, the second pair of screw sets having a pitch greater than the pitch of the first pair of screw sets for allowing the asphalt-aggregate material at the center portion of the hopper means to combine with the material transported by the first set of screw sets from the transverse extremities of the hopper means.

17. The apparatus according to claim 16 wherein said second conveyor means includes a first section and a second section, the first section being arranged for transporting the asphalt-aggregate material from the lower portion of the hopper means to an elevated position, the second section being in the form of a horizontally and vertically disposed swinging conveyor for receiving the asphalt-aggregate material from said first section of said second conveyor means and for delivering the material to the finishing machine.

18. The apparatus according to claim 14 wherein said screw auger means is configured for advancing the asphalt-aggregate material from the transverse extremities of the hopper means to the central portion thereof.

19. The apparatus according to claim 18 wherein said second conveyor means has first and second sections, the first section being arranged for transferring the asphalt-aggregate material from the screw auger means to an elevated position, the second section being in the form of a horizontally and vertically disposed swinging conveyor for receiving the asphalt-aggregate material from said first section of said second conveyor means and delivering the material to the finishing machine.

20. The apparatus according to claim 19 wherein said first and second sections of said second conveyor means have a width substantially less than the width of said first conveyor means.

* * * * *